Figure 1:
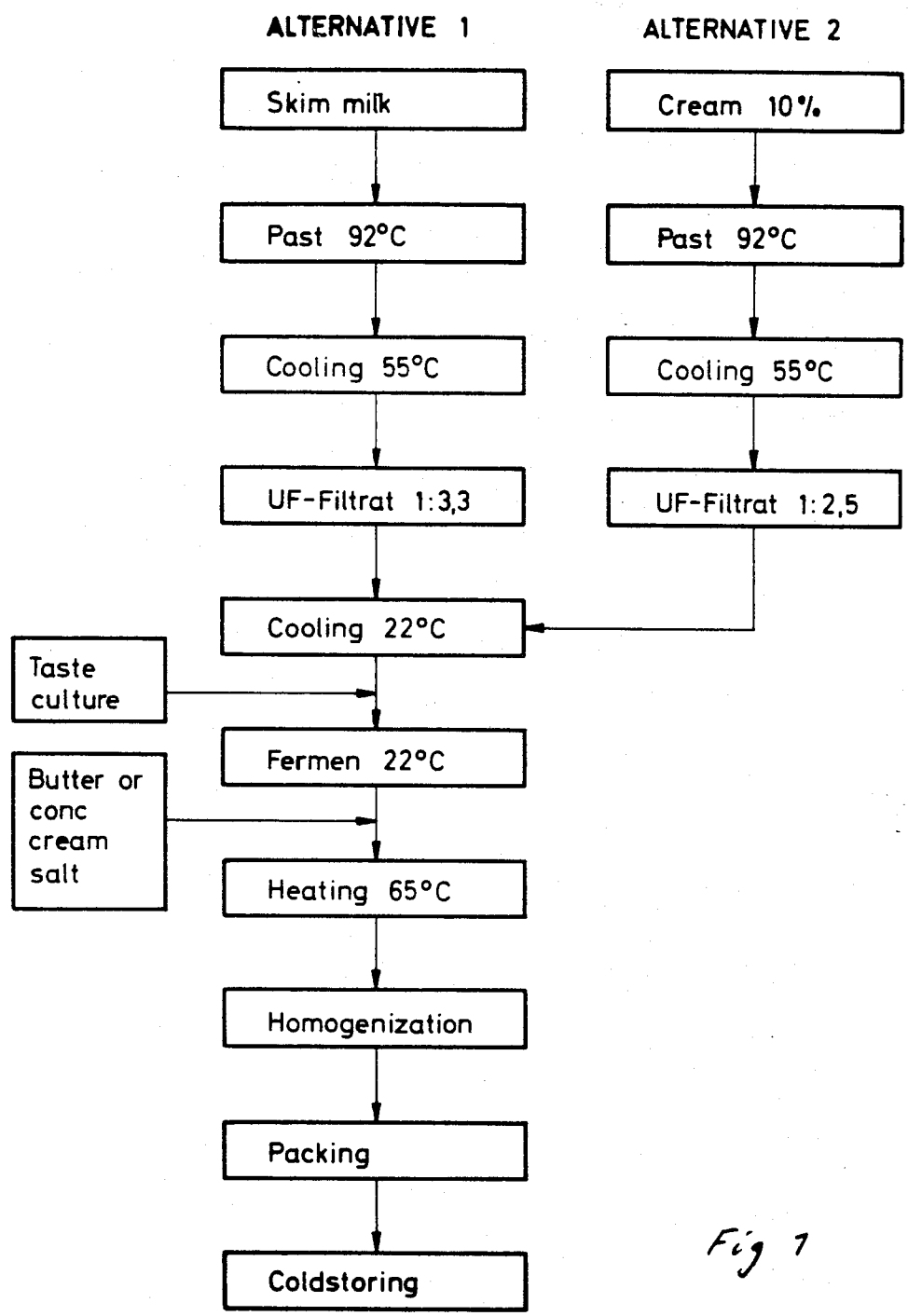

United States Patent [19]

Andersson

[11] Patent Number: 4,511,591

[45] Date of Patent: Apr. 16, 1985

[54] SPREADABLE FAT PRODUCT AND METHOD FOR ITS PRODUCTION

[75] Inventor: Kenneth L. Andersson, Sandby, Sweden

[73] Assignee: Alfa-Laval AB, Tumba, Sweden

[21] Appl. No.: 467,485

[22] PCT Filed: Jun. 11, 1982

[86] PCT No.: PCT/SE82/00210

§ 371 Date: Feb. 9, 1983

§ 102(e) Date: Feb. 9, 1983

[87] PCT Pub. No.: WO83/00005

PCT Pub. Date: Jan. 6, 1983

[30] Foreign Application Priority Data

Jun. 25, 1981 [SE] Sweden ............................. 8103998

[51] Int. Cl.³ .......................... A23D 3/00; A23D 3/02
[52] U.S. Cl. ..................................... 426/603; 426/613
[58] Field of Search ........................ 426/603, 604, 613

[56] References Cited

U.S. PATENT DOCUMENTS

| | | | |
|---|---|---|---|
| 2,233,179 | 2/1941 | Otting et al. | 426/603 |
| 4,051,269 | 9/1977 | Strinning | 426/603 |
| 4,112,132 | 9/1978 | Badertscher et al. | 426/603 |

FOREIGN PATENT DOCUMENTS 1363783 8/1974 United Kingdom .

*Primary Examiner*—Robert Yoncoskie
*Attorney, Agent, or Firm*—Cyrus S. Hapgood

[57] ABSTRACT

Fat product which is spreadable at refrigerator temperature and contains 35–55% fat, 4–7% protein and 41–58% water. The protein has been obtained from an ultra-filtrated milk product, at which the fat product after mixing the protein concentrate with the fat raw material and homogenization of the fat spheres consists of a stable oil-in-water emulsion. The emulsion is stabilized by the milk protein. The fat product is free from additives in the form of stabilizing agents and emulsifiers. The method to manufacture the fat product is seen from the attached flow-chart, which shows the steps in the process.

8 Claims, 3 Drawing Figures

SPREADABLE FAT PRODUCT AND METHOD FOR ITS PRODUCTION

The present invention relates to a fat product, which is spreadable at a refrigerator temperature and contains 35–55% fat, 4–7% protein and 41–58% water.

It is known since long to produce different spreadable fat products with a low fat content in order to meet a consumer interest in products with a low calory content. The manufacture of such products are described e.g. in SE No. 393 253, which describes a fat emulsion of the type water-in-oil with a low calory content and a high content of protein. This fat emulsion is produced from milk, which milk is membrane filtrated, after which the protein concentrate is heat treated before it is forced to emulsify in a fat phase, at which there is obtained a water-in-oil emulsion. Also through a USSR-publication No. 645 640 there is known to manufacture a fat product with a low fat content and a high protein content. The protein concentrate is obtained by ultrafiltration of skim milk, which is mixed with cream after which the mixture is churned. At that a water-in-oil emulsion is produced.

The two fat products described above consist of water-in-oil emulsions, which are the most common type of emulsion for both margarine, butter and margarine with a reduced fat content.

It is known per se to manufacture fat products also in form of oil-in-water emulsions. A study of such emulsions is shown in the Canadian Dairy and Ice Cream Journal 45 (1966):1, where there is described a fat product where the milk protein consists of calcium-reduced skim milk powder. The skim milk powder is reconstituted in water and mixed at high speed with fat. Owing to the reduced calcium content the skim milk powder is made more absorbent. Any product of this type is not available on the market to-day, which may depend on the fact that the chemical change of the caseinate has resulted in a taste of the fat product which has not been accepted by the consumers.

Another fat product, which consists of an oil-in-water emulsion, is described in the Australian Patent Publication No. 498 980. In this product the fat phase consists of milk fat and animal or vegetable fat mixed with a water phase, containing a stabilizing agent such as soja meal, gelatine or modified starch.

According to the invention, there is now proposed a new spreadable fat product, which combines characterizing features from fat products earlier known in a new manner. The proposed fat product contains protein which is obtained by ultra-filtration of a milk product, which protein concentrate after mixing with a fat raw material and breaking up the fat in small spheres constitutes a stable oil-in-water emulsion, which emulsion is stabilized by the milk protein, which fat product is free from additives in the form of stabilizing agents and emulsifiers. It has been found that this product, where the protein source consists of an ultra-filtrated milk is considered better regarding to taste than fat products, in which conventional protein sources as milk powder and condensed milk are included. The latter contains lactose, which gives the products a taste of melt cheese.

The fat raw material may consist both of milk fat and fat from another origin. Even when the fat consists of milk fat the product has an excellent spreadability at refrigerator temperature. The continuous phase in an emulsion determines the characteristics of the emulsion. A product of milk fat where the fat constitutes a continuous phase is not spreadable at refrigerator temperature.

The crystals of the fat form a network, where the number of crystals determines the hardness of the product. When the product is warmed some of the crystals melt and the fat becomes softer.

Our product consists of a number of small drops or spheres of fat, which certainly contain crystallized fat, but the small spheres glide and roll upon each other in such a way that the product is still soft anyhow. These little fat spheres are achieved by homogenization. According to the invention a spreadable product is obtained, which contains only milk fat and this is a great advantage in many countries, where it is forbidden to sell products which contain milk fat mixed with another fat.

Figure 3:
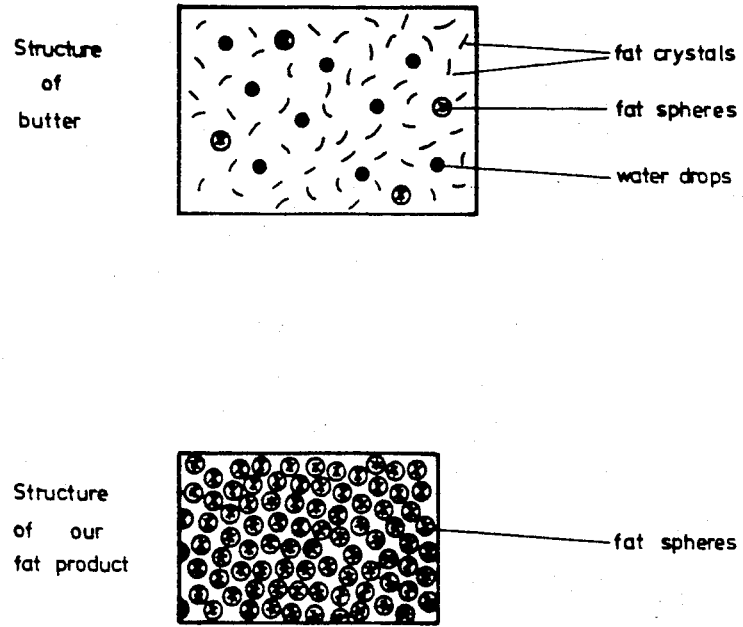

The structures are shown in FIG. 3.

The fat product has also a superior shelf life even if it is manufactured as a "nature product" i.e. completely without any additives in the form of emulsifiers and stabilizing agents. The milk protein forms a protein shell around the fat drops in the emulsion and the emulsion remains stable for a long time. At a reduced fat content an increased amount of protein is needed, since the amount of water increases at the same time and more protein is needed to bind the water in the form of a gel. At a fat content of 35% there is needed 7% of protein, while at a fat content of 55% only 4% of protein is needed to make the product stable.

The limits given in the first part of the main claim for the fat content are due to consumer viewpoints. A fat product with a fat content below 35% tastes like a melt cheese, while a fat product with a higher fat content than 55% cannot be considered as a fat product with a reduced calory content.

The proposed fat product is manufactured from milk, a milk product with or without fat, which is pasteurized at 85–95° C., ultra-filtrated after cooling in order to achieve a concentration of protein and a diminishing of the lactose content simultaneously, after which the concentrate enriched in protein is mixed with the fat raw material and homogenized at 40–70° C. in order to form a stable oil-in-water emulsion. With the expression "homogenization" we do not only mean giving the product a homogenous structure but subjecting the product to the unit operation which in the dairy industry is called homogenization. This treatment means that the fat spheres are subjected to a strong mechanical treatment which reduces the size of the fat spheres down a size smaller than 10μ.

In the present invention, where the water is the continuous phase in the fat product, the product may easily be flavoured by fermenting a part or the whole protein concentrate. In this way the product may be given yoghurt-, kefir-, or butter taste as desired.

According to the proposed method a fat product containing different kinds of fat may be obtained as desired. The method according to the invention may with advantage be used, when the fat raw material consists of milk fat, since the obtained fat product has a superior spreadability at refrigerator temperature. Otherwise it may be very difficult to spread milk fat butter at this temperature.

The homogenization of the achieved mixture may with advantage take place in a two-step homogenization process. It is possible to obtain a stable fat product by making the mixture pass once through a homogenizer, but with homogenization in two steps a still better distribution of the size of the fat spheres is obtained. After homogenization the still warm product is packed directly in consumer packings.

The manufacture of a fat product according to the invention is described further with reference to the attached flow-chart, which shows manufacture of a fat product based completely on milk, FIG. 1. In this two alternatives are shown—the manufacture of a fat product from skim milk and from cream.

The skim milk, alternatively cream, is pasteurized for three minutes at 92° C., is cooled thereafter to 55° C. and ultra-filtrated at pH 6.0–7.0. At that the milk raw-material is concentrated in that water and lactose are passed through the membrane. As may be seen from the flow-chart the skim milk is concentrated (1:3,3) more than the cream (1:2,5). After cooling to 22° C. the taste culture comprising e.g. butter acid bacteria is added to a part or the whole amount of the protein concentrate, after which it may ferment during 19 hours at 22° C. The skim milk concentrate has a protein content of 10–11% the cream concentrate a protein content of up to 8%.

The protein concentrate is thereafter mixed with fat raw material in the form of butter or concentrated cream and salt, the mixture is heated to 65° C. and homogenized in two steps, step 1 with a pressure of 150 kp/cm² (15 MPa) step 2 with a pressure of 50 kp/cm² (5 MPa). The product may be packed warm directly after the homogenization, after which it is cold stored.

In order to give some more information about the invention an example on the manufacture of a fat product according to the invention is given below.

EXAMPLE 143 kg cream (10% fat) is pasteurized at 92° C. with a holding time of three minutes. After the pasteurization the cream is cooled to 55° C. and ultra-filtrated, such that the concentration is increased 2.5 times, that means that the protein content is about 8%. After the concentration there remain 57 kg milk concentrate, which is cooled to 22° C. Two thirds of the concentrate is fermented during 18 h at 22° C. to appr. pH 4.8. Fermented and unfermented concentrate is mixed with 50 kg melted butter and 1.2 kg salt. A favourable pH for the achieved mixture is 5.0–5.2. After having heated the mixture to 65° C. it is homogenized in two steps (150 resp.50 kp/cm²), after which the obtained fat product is wrapped in consumer packings.

Figure 2:
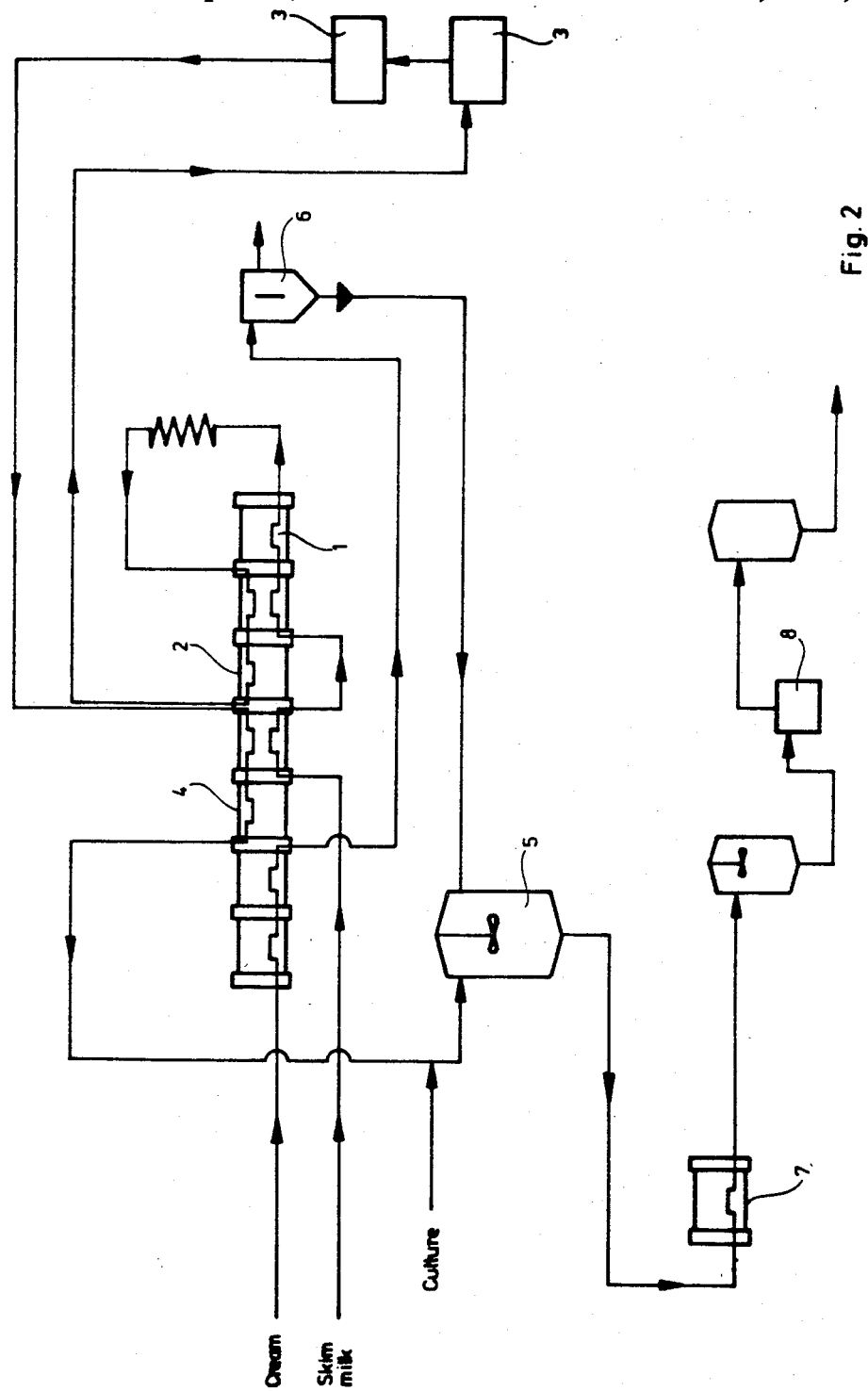

The method of producing the fat product according to the invention is shown in FIG. 2 of the attached drawing, on which it is seen that skim milk is heated and pasteurized in one section 1 of a plate heat exchanger and cooled by flowing in counter-current to the milk to be treated in another section 2.

After this treatment the milk is led to the UF-filter 3 and concentrated. The concentrate is forwarded to the plate heat exchanger 4 and cooled. A part of the concentrate is fermented by adding taste culture. After fermenting for the desired time in a tank 5 concentrated cream is added.

The cream has been heated and concentrated in a centrifugal separator 6, after which it is led to the tank 5. The mixture is led to a plate heat exchanger 7 and heated to the desired homogenization temperature. It is then forwarded to a 2-step homogenizator 8, where the fat-in-water emulsion is formed. The fat product is packaged warm.

I claim:

1. A fat product containing 35–55% fat, 4–7% ultra-filtrated milk protein and 41–58% water, said fat being in the form of spheres each smaller than 10$\mu$, said fat and water forming an oil-in-water emulsion, said protein forming shells around said fat spheres to stabilize the emulsion, said fat product being spreadable at refrigerator temperature and being free from additives in the form of stabilizing agents and emulsifiers.

2. The fat product of claim 1, in which said fat is milk fat.

3. A method of manufacturing a fat product which is spreadable at refrigerator temperature and which is free of additives in the form of stabilizing agents and emulsifiers, said method comprising the steps of pasteurizing milk at 85–95° C., cooling and then ultra-filtrating the pasteurized milk to provide a protein concentrate, mixing said concentrate with fat and water to form a mixture containing 35–55% fat, 4–7% protein and 41–58% water, and forming an oil-in-water emulsion by subjecting said mixture to homogenization, said homogenization being sufficient to reduce said fat to spheres each smaller than 10$\mu$ and surrounded by shells of said protein to stabilize the emulsion.

4. The method of claim 3, in which said fat is milk fat.

5. The method of claim 3, in which said homogenization is carried out in two stages.

6. The method of claim 3, in which at least part of the protein concentrate, prior to said mixing, is flavored in the presence of flavoring bacteria.

7. The method of claim 3, in which said homogenization is effected at a temperature of 40–70° C.

8. The method of claim 3, in which the fat product is packaged directly after said homogenization.

* * * * *